United States Patent
Christ

(10) Patent No.: US 6,405,852 B1
(45) Date of Patent: Jun. 18, 2002

(54) TRANSPORT DEVICE IN A PACKAGING MACHINE

(75) Inventor: Richard Christ, Emmelshausen (DE)

(73) Assignee: IWK Verpackungstechnik GmbH (DE)

(*) Notice: Subject to any disclaimer, the term of this patent is extended or adjusted under 35 U.S.C. 154(b) by 0 days.

(21) Appl. No.: 09/558,590

(22) Filed: Apr. 26, 2000

(30) Foreign Application Priority Data

Apr. 29, 1999 (DE) .......................................... 199 19 497

(51) Int. Cl.$^7$ .............................................. B65G 17/16
(52) U.S. Cl. ..................................... 198/802; 198/474.1
(58) Field of Search .......................... 198/468.3, 469.1, 198/470.1, 474.1, 475.1, 478.1, 375, 377.02, 867.11, 867.12, 867.14, 803.14, 803.15, 850, 851, 849, 838

(56) References Cited

U.S. PATENT DOCUMENTS

| | | | | |
|---|---|---|---|---|
| 2,758,696 A | * | 8/1956 | Eyler | 198/802 |
| 3,678,774 A | * | 7/1972 | Patrignani | 74/250 R |
| 3,854,573 A | * | 12/1974 | Freier, Sr. | 104/172.4 |
| 4,000,568 A | * | 1/1977 | Donkers | 37/69 |
| 4,232,783 A | * | 11/1980 | Kraft | 198/851 |
| 4,664,253 A | * | 5/1987 | Fahrion | 198/851 |
| 4,993,996 A | * | 2/1991 | Horny et al. | 474/155 |
| 5,072,827 A | * | 12/1991 | Santicchi | 198/678.1 |
| 5,137,144 A | * | 8/1992 | Uehara | 198/822 |
| 5,305,872 A | * | 4/1994 | Hutton | 198/853 |
| 5,316,127 A | * | 5/1994 | Evrard | 198/470.1 |
| 5,351,811 A | * | 10/1994 | Tisma | 198/845 |
| 5,857,558 A | * | 1/1999 | Irvine | 198/803.2 |
| 5,921,368 A | * | 7/1999 | Zaguroli, Jr. | 192/3 D |

FOREIGN PATENT DOCUMENTS

| | | |
|---|---|---|
| AT | 26 955 | 9/1984 |
| DE | 24 07 826 | 9/1975 |
| EP | 0 117 791 | 5/1987 |

* cited by examiner

Primary Examiner—Christopher P. Schwartz
Assistant Examiner—Benjamin A Pezzlo
(74) Attorney, Agent, or Firm—Paul Vincent

(57) ABSTRACT

A transport device in a packaging machine, in particular a tube filling machine, comprises an endless belt guided via at least two deflection pulleys on the outer side of which a plurality of supporting devices are disposed. One end of each supporting device is borne for pivoting on the endless belt via a bolt extending transversely to the longitudinal direction of the endless belt with the opposite end engaging with the neighboring supporting device in a pivoting manner and also in a displaceable manner in the longitudinal direction of the endless belt. For precision bearing thereof, the supporting device is connected to the neighboring supporting device via at least one joint plate, connected to the supporting device for pivoting about a first axis and connected to the neighboring supporting device for pivoting about a second axis which is parallel thereto.

5 Claims, 1 Drawing Sheet

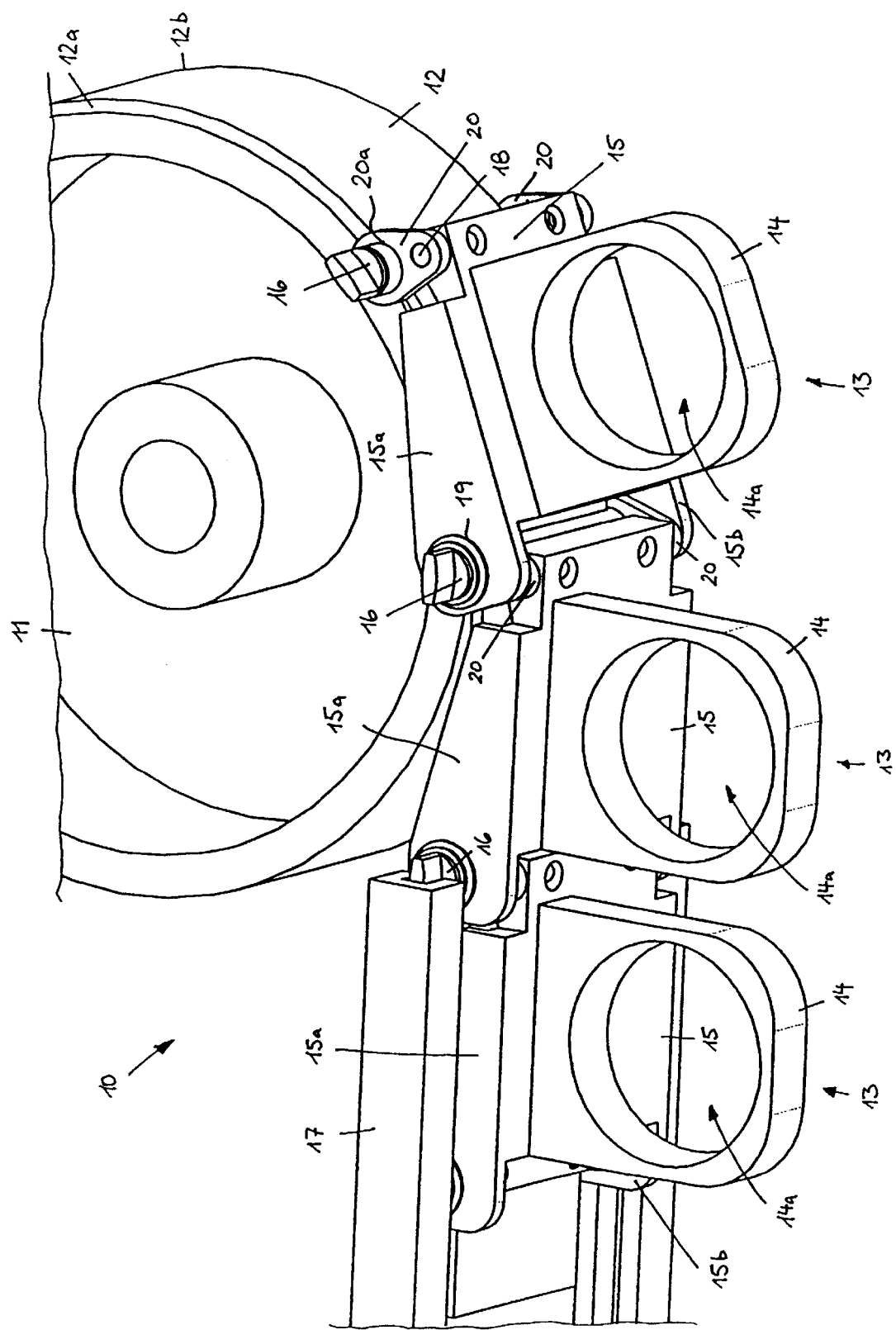

TRANSPORT DEVICE IN A PACKAGING MACHINE

This application claims Paris Convention priority of DE 199 19 497.1 filed Apr. 29, 1999 the complete disclosure of which is hereby incorporated by reference.

BACKGROUND OF THE INVENTION

The invention concerns a transport device in a packaging machine, in particular a tube filling machine comprising an endless belt guided via at least two deflection pulleys, on the outer side of which a plurality of supporting devices are disposed, one end of each being borne for pivoting on the endless belt via a bolt extending transversely to the longitudinal extension of the endless belt, and the opposite end of which engaging in the neighboring supporting device in a pivoting manner and also for displacement in the longitudinal direction of the endless belt.

When filling and closing a tube in a tube filling machine, the tube must be guided by a transport device through several working stations. The tube is usually borne in a tube holder whose dimensions are adapted to the tube to safely support the tube with tight fit. A so-called oval conveyor is frequently used as a transport means and comprises an endless conveyor belt guided via at least two deflection pulleys or wheels. The conveyor may be a belt, e.g. a toothed belt or a chain. A plurality of supporting devices are mounted, with the mentioned tube holders, to the outer side of the endless belt and circulate with the endless belt. Drive is effected by a driving motor acting on one of the deflection pulleys.

The quality of the filling or closing operations and the functional safety or susceptibility to malfunctioning of the tube filling machine depend essentially on the positioning accuracy of the tubes in the individual working stations. It is therefore important to mount the supporting devices or tube holders safely and with high accuracy to the outer side of the endless belt. The supporting devices must thereby be supported such that, in the deflection region of the endless belt at the deflection pulleys, neighboring supporting devices can exert a relative pivoting motion and also slight displacement in the longitudinal direction of the endless belt to prevent the occurrence of constraining forces and constraining stresses and strains.

In conventional tube filling machines, each supporting device is borne on the endless belt by mounting a bolt to the outer side of the endless belt the bolt extending on the outer surface of the endless belt and being perpendicular to the longitudinal direction thereof. The supporting device captures the bolt within two bores spaced apart from one another by approximately the width of the endless belt to thereby form a pivoting bearing having two bearing points spaced apart across the width of the endless belt. The opposite end of the supporting device comprises one single fork-shaped receptacle which surrounds the bolt of the neighboring supporting device. The bolt can be displaced in the fork-shaped receptacle. In this fashion, a rectilinear sliding pair is formed which can compensate for the length variations between the bolts of two neighboring supporting devices during deflection at the deflection pulleys.

Practice has shown that the rectilinear sliding pair, which usually consists of plastic, wears rapidly with time, since it abuts with the bolt along a relatively small surface, leading to relatively high local stress maxima. Wear is further increased by the fact that lubricants are normally not used in the transport device, since, for hygienic reasons, the open tubes should not come in contact with any lubricant. Moreover, the maintenance and amount of work required for lubricating all joints of such a transport device would be excessive.

The conventional supporting devices comprise a three-point-support with two pure pivot bearings on the bolt, disposed at a distance from one another in the transverse direction, and with a rectilinear sliding pair disposed at the opposite end. Although this provides a statically defined support which prevents constraints, it has however been shown that the spatial stability of such a support is insufficient in certain situations, since the three-point support tends to tilt about its diagonal axis due to the asymmetric arrangement of the supporting points, wherein the lever arm of the bearings is relatively short for accepting the associated torque. It is impossible or very difficult to achieve rigid support of the supporting devices or tube holders in this fashion.

It is the underlying purpose of the invention to create a transport device of the above mentioned type which guarantees precise positioning of the supporting devices over a long operating time.

SUMMARY OF THE INVENTION

This object is achieved in accordance with the invention in a transport device of a packaging machine in that the supporting device is connected to the neighboring supporting device via at least one joint plate which is connected to the supporting device for pivoting about a first axis, and which is connected to the neighboring supporting device for pivoting about a second axis parallel thereto.

The joint plate is preferably disposed at an angle relative to the longitudinal direction of the transport belt such that the mutual distance between two neighboring supporting devices can be compensated for by changing the angular position of the joint plate without causing constraining forces. Moreover, the joint plate permits neighboring supporting devices to pivot with respect to one another. Pure rotational motion has more favorable frictional and sliding relationships than does translational motion, so that the wear behavior of the rotary joints in the joint plates is less than that of the conventional rectilinear sliding pair. This considerably increases the service life of the transport device. Moreover, the joint plates substantially increase the spatial stability, in particular with respect to tilting behavior, compared to the rectilinear sliding pair with capturing fork-shaped receptacle. This increases the overall stability of the transport device such that predetermined positions can be set in a reproducible manner with high accuracy. This is favorable for the quality of the filled, closed tubes.

In a preferred embodiment of the invention, each pair of neighboring supporting devices is connected to each another via two joint plates to obtain a four-point support for each supporting device by providing two spaced apart supporting points on the bolt at the one end of the supporting device and two likewise distanced supporting points on the two joint plates at the other end of the supporting device. The joint plates should thereby be spaced apart from one another as far as possible. This can be effected, in particular, by disposing them close to one of the longitudinal edges of the endless belt. The four-point support makes the suspension of the supporting devices exceptionally rigid, wherein the tubes can be guided through the tube filling machine with high precision. Theoretically, a four-point support is overdetermined. However, the support is not subjected to excessive loads since typical modern production tolerances can maintain very small tolerance deviations of the support points from their desired values which, in turn, can be compensated for by the elasticity of the overall system and, in particular, of the endless belt to reduce theoretically conceivable load peaks.

With the four-point support, external forces acting e.g. when inserting and lifting out the tube holder, no longer cause lateral tilting and are largely compensated for by the supporting device, since the lever arm for accepting torques is substantially larger than that of a three-point support due to the mutual distance of the supports.

In a preferred embodiment, the joint plates are directed essentially perpendicular to the longitudinal extension of the endless belt when the supporting devices are rectilinear, i.e. in the area between the deflection pulleys. This permits neighboring supporting devices to be disposed very close to one another with the joint plates requiring little construction space to increase the number of supporting devices in the transport device. In addition, there is sufficient space to compensate for changes in distance due to relative motion between neighboring supporting devices in the longitudinal direction of the endless belt by disposing the joint plates in an inclined manner.

In a preferred embodiment of the invention, the second axis is formed by the bolt of the neighboring supporting device disposed on the endless belt. Use by the joint plates of the already existing bolt of the neighboring supporting device permits realization of the support in a very compact manner and with relatively few construction parts.

Preferably, the bolt projects beyond the supporting device and can engage into a guiding rail in a rectilinear section of the transport device between the deflection pulleys to safely position the supporting device.

Further details and features of the invention can be extracted from the following description of an embodiment with reference to the drawing.

BRIEF DESCRIPTION OF THE DRAWING

The single figure shows a three-dimensional view of a transport device in the area of a deflection pulley.

DESCRIPTION OF THE PREFERRED EMBODIMENT

A transport device 10 of a tube filling machine shown in the figure comprises an endless belt 12 which is guided via deflection pulleys 11, of which only one is shown. The outside of the endless belt 12 is provided with a plurality of supporting devices 13, each comprising a plate-like base part 15, disposed parallel to the outside of the endless belt 12 and a supporting plate 14 projecting outwardly from the base part 15 and having an opening 14a for inserting tube holders (not shown). Side parts 15a, 15b are formed at the upper and lower end of the base part 15, i.e. close to the side edges 12a and 12b of the endless belt 12 and extend essentially perpendicular thereto such that the base part 15 forms a U-shaped configuration with the side parts 15a and 15b, and partially surrounds the endless belt 12.

Bolts 16 are mounted in a conventional manner to the outside of the endless belt 12 and extend transverse to its longitudinal extension. Each bolt 16 penetrates through a bore 19 in the side parts 15a and 15b such that each supporting device 13 can be pivoted about a bolt 16 associated therewith, wherein the pivoting bearing is formed at one end of the supporting device.

Pins 18 are mounted to the upper and lower side of the base part 15 at the opposite end of the supporting device 13, each of which is close to one of the longitudinal edges 12a and 12b of the endless belt 12 and which extend parallel to the bolt 16. Each pin 18 pivotably bears a joint plate 20 whose bore 20a surrounds the bolt 16 of the neighboring supporting device and which can also pivot about same. Each supporting device 13 is thereby held by a four-point support comprising the two pivot bearings between the side parts 15a and 15b and the bolt 16 and the two pivotably borne joint plates 20. The upper side of the bolt 16 protrudes beyond the supporting device 13 and can, in a rectilinear section of the transport device (i.e. in a section between the deflection pulleys) thereby engage into an associated guiding rail 17 having a U-shaped profile, open towards the bottom.

As shown in the figure, the guiding plates are essentially transverse to the direction of motion in the rectilinear section of the endless belt 12, i.e. away from the deflection pulleys 13, such that neighboring supporting devices 13 closely abut. When a supporting device enters the deflection area at a deflection pulley 11, it is pivoted about the bolt 16 relative to the neighboring supporting device. Moreover, length compensation in the longitudinal direction of the endless belt 12 is effected by the pivoting of the joint plates 20 about the pins 18 and the associated joint bolt 16.

I claim:

1. A transport device in a packaging machine, the device comprising:

at least one first deflection pulley;

at least one second deflection pulley disposed at a separation from said first deflection pulley;

an endless belt guided on said first and said second deflection pulleys for circulation about said first and said second deflection pulleys;

a plurality of bolts, each of said bolts disposed on said endless belt at a separation from a neighboring bolt, each of said bolts having a bolt axis extending in a direction substantially transverse to a longitudinal extension of said belt;

a plurality of supporting devices mounted to an outside of said belt, each of said supporting devices having a first side mounted to one of said bolts for pivoting about said bolt axis thereof, each of said supporting devices having a second side opposite said first side and separated from said first side in a direction of said longitudinal extension of said belt; and a plurality of joint plates, each of said joint slates hinged to one of said supporting devices at said second side thereof for pivoting about a plate axis and hinged to a neighboring one of said supporting devices at said first side thereof for pivoting about a second axis, parallel to said plate axis.

2. The transport device of claim 1, wherein each of said supporting devices is connected to a neighboring supporting device via two of said joint plates, one of which is disposed proximate an upper edge of said endless belt and the other proximate a lower edge of said endless belt.

3. The transport device of claim 1, wherein each of said joint plates extends substantially perpendicular to said longitudinal extension of said endless belt at locations along said endless belt where said supporting devices travel in a substantially linear manner.

4. The transport device of claim 1, wherein said second axis is formed by a bolt of a neighboring supporting device disposed on said endless belt.

5. The transport device of claim 1, further comprising a guiding rail, wherein each of said bolts protrudes beyond said supporting devices to engage into said guiding rail in a rectilinear section of the transport device.

* * * * *